United States Patent
Hester et al.

(10) Patent No.: US 7,140,495 B2
(45) Date of Patent: *Nov. 28, 2006

(54) LAYERED SHEET CONSTRUCTION FOR WASTEWATER TREATMENT

(75) Inventors: Jonathan F. Hester, Hudson, WI (US); Brian E. Spiewak, Inver Grove Heights, MN (US); David R. Holm, Hudson, WI (US); Jerald W. Hall, Jr., Maplewood, MN (US); Seth M. Kirk, Minneapolis, MN (US); Moses M. David, Woodbury, MN (US); Brinda B. Lakshmi, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 635 days.

This patent is subject to a terminal disclaimer.

(21) Appl. No.: 10/017,632

(22) Filed: Dec. 14, 2001

(65) Prior Publication Data

US 2003/0104192 A1 Jun. 5, 2003

(51) Int. Cl.
*B01D 29/07* (2006.01)
(52) U.S. Cl. ............... 210/490; 210/506; 210/640; 210/510.1; 96/6; 96/11; 95/46; 428/316.6; 428/319.3; 428/319.7; 428/182
(58) Field of Classification Search ........ 210/615, 210/605, 903, 906, 486, 321.74, 321.75; 428/305.5, 308.4, 182, 304.4
See application file for complete search history.

(56) References Cited

U.S. PATENT DOCUMENTS

| | | |
|---|---|---|
| 3,432,585 A | 3/1969 | Watson et al. |
| 3,586,220 A | 6/1971 | Reinsberg |
| 3,971,373 A | 7/1976 | Braun |
| 4,181,604 A | 1/1980 | Onishi et al. |
| 4,184,922 A | 1/1980 | Knazek et al. |
| 4,333,779 A | 6/1982 | Rinker et al. |
| 4,416,993 A | 11/1983 | McKeown |
| 4,537,860 A | 8/1985 | Tolbert et al. |
| 4,539,256 A | 9/1985 | Shipman |
| 4,576,718 A | 3/1986 | Reischl et al. |
| 4,726,989 A | 2/1988 | Mrozinski |
| 4,746,435 A | 5/1988 | Onishi et al. |
| 4,814,278 A | 3/1989 | Hamamoto et al. |
| 4,834,881 A | 5/1989 | Sawada et al. |
| 4,867,881 A | 9/1989 | Kinzer |
| 4,894,060 A | 1/1990 | Nestegard |

(Continued)

FOREIGN PATENT DOCUMENTS

EP 0197024 8/1986

(Continued)

OTHER PUBLICATIONS

English Abstract of JP 03-074047, Hanabusa et al, "Battery", Mar. 28, 1991, 2 pages.*

(Continued)

*Primary Examiner*—Hai Vo
(74) *Attorney, Agent, or Firm*—Douglas B. Little

(57) ABSTRACT

Described is an apparatus for the removal of organic substances and/or nitrogen sources from an aqueous medium by exposing the aqueous medium to the action of microorganisms supported on a gas permeable, water impermeable layer, or on and/or in a three dimensional microbial support layer, that is proximate a gas delivery layer through which gas, preferably, oxygen-containing gas, is supplied to the gas permeable layer such that it diffuses through the gas permeable layer and is supplied to the microorganisms.

7 Claims, 5 Drawing Sheets

U.S. PATENT DOCUMENTS

| | | | |
|---|---|---|---|
| 4,954,256 A * | 9/1990 | Degen et al. | 210/490 |
| 5,015,379 A | 5/1991 | Drori | |
| 5,077,870 A | 1/1992 | Melbye et al. | |
| 5,078,925 A * | 1/1992 | Rolando et al. | 264/6 |
| 5,116,506 A | 5/1992 | Williamson et al. | |
| 5,120,594 A | 6/1992 | Mrozinski | |
| 5,126,050 A | 6/1992 | Irvine et al. | |
| 5,127,925 A * | 7/1992 | Kulprathipanja et al. | 95/54 |
| 5,134,174 A | 7/1992 | Xu et al. | |
| 5,176,953 A | 1/1993 | Jacoby et al. | |
| 5,217,802 A | 6/1993 | Scarmoutzos | |
| 5,236,963 A | 8/1993 | Jacoby et al. | |
| 5,238,623 A | 8/1993 | Mrozinski | |
| 5,260,360 A | 11/1993 | Mrozinski et al. | |
| 5,317,035 A | 5/1994 | Jacoby et al. | |
| 5,352,513 A | 10/1994 | Mrozinski et al. | |
| 5,605,835 A | 2/1997 | Hu et al. | |
| 5,670,302 A | 9/1997 | Lau et al. | |
| 5,679,302 A | 10/1997 | Miller et al. | |
| 5,690,949 A | 11/1997 | Weimer et al. | |
| 5,712,154 A | 1/1998 | Mullon et al. | |
| 5,713,842 A | 2/1998 | Kay | |
| 5,738,111 A | 4/1998 | Weimer et al. | |
| 5,743,981 A | 4/1998 | Lu | |
| 5,792,411 A | 8/1998 | Morris et al. | |
| 5,888,594 A | 3/1999 | David et al. | |
| 5,899,893 A | 5/1999 | Dyer et al. | |
| 5,948,166 A | 9/1999 | David et al. | |
| 5,981,211 A | 11/1999 | Hu et al. | |
| 5,989,698 A * | 11/1999 | Mrozinski et al. | 428/315.7 |
| 6,010,776 A | 1/2000 | Exsted et al. | |
| 6,042,877 A | 3/2000 | Lyon et al. | |
| 6,068,771 A * | 5/2000 | McDermott et al. | 210/321.82 |
| 6,096,213 A | 8/2000 | Radovanovic et al. | |
| 6,110,588 A | 8/2000 | Perez et al. | |
| 6,147,131 A | 11/2000 | Mork et al. | |
| 6,153,097 A * | 11/2000 | Jensvold et al. | 210/321.81 |
| 6,168,648 B1 | 1/2001 | Ootani et al. | |
| 6,274,638 B1 | 8/2001 | Yonemura et al. | |
| 6,280,824 B1 * | 8/2001 | Insley et al. | 428/172 |
| 6,322,703 B1 * | 11/2001 | Taniguchi et al. | 210/636 |
| 6,355,081 B1 * | 3/2002 | Wang et al. | 55/524 |
| 6,514,412 B1 * | 2/2003 | Insley et al. | 210/649 |
| 6,558,549 B1 * | 5/2003 | Cote et al. | 210/605 |
| 2002/0020666 A1 | 2/2002 | Cote et al. | |
| 2003/0104192 A1 | 6/2003 | Hester et al. | |

FOREIGN PATENT DOCUMENTS

| | | |
|---|---|---|
| EP | 0 492 942 B1 | 12/1991 |
| EP | 0526823 | 10/1993 |
| EP | 0840072 | 6/1998 |
| EP | 1 142 702 A1 | 10/2001 |
| WO | WO 97/44508 | 11/1997 |
| WO | WO 98/20185 | 5/1998 |
| WO | WO 99/65542 | 12/1999 |
| WO | WO 99/65595 * | 12/1999 |
| WO | WO 99/65664 | 12/1999 |
| WO | WO 00/43579 | 7/2000 |
| WO | WO 200044472 A1 * | 8/2000 |
| WO | WO 00/68301 | 11/2000 |
| WO | WO 00/71789 | 11/2000 |
| WO | WO 01/21693 | 3/2001 |

OTHER PUBLICATIONS

Keth Brindle, Tom Stephenson, Michael J. Semmens, "Pilot-Plant Treatment of a High-Strength Brewery Wastewater Using a Membrane-Aeration Bioreactor," Water Environment Research, vol. 71, No. 6, pp. 1197-1204 (Sep./Oct., 1999).

John T. Cookson, Jr., Bioremediation Engineering: Design and Application, McGraw-Hill, Inc., 1995, Chapter 8, pp. 305-358, and Chapter 9, pp. 359-432.

"Water Treatment Membrane Processes," American Water Works Association Research Foundation, Lyonnaise des Eaux, Water Research Commission of South Africa, McGraw-Hill, Inc., Chapter 8 by P. Aptel and M.J. Semmens entitled "Multiphase Membrane Processes," pp. 8.1-8.19.

Y. Suzuki et al., "Oxygen Supply Method Using Gas Permeable Film For Wastewater Treatment," Wat. Sci Tech., vol. 28, No. 7 pp. 243-250, 1993.

M. Pankhania et al., Hollow Fibre Bioractor For Wastewater Treatment Using Bubbleless Membrane Aeration, Wat. Res., vol. 28, No. 10, pp. 2233-2236, 1994.

Pierre Cote et al, "Bubble-Free Aeration Using Membranes: Process Analysis," Journal WPCF, vol. 60, No. 11, pp. 1986-1992, Nov. 1988.

Pierre Cote, "Bubble-Free Aeration Using Membranes: Mass Transfer Analysis,"Journal of Membrane Science, 47 (1989) 91-106.

Keith Brindle et al., "The Application of Membrane Biological Reactors for the Treatment of Wastewaters," Biotechnology and Bioengineering, vol. 49, pp. 601-610 (1996).

E. Casey et al., "Review of Membrane Aerated Biofilm Reactors," Resources, Conservation and Recycling 27 (1999) 203-215.

Tariq Ahmed et al., "The Use of Independently Sealed Microporous Hollow Fiber Membranes for Oxygenation of Water; Model Development," Journal of Membrane Science, 69 (1992) 11-20.

40 C.F.R. Ch. I (Jul. 1, 1999 Edition) §§796.1050-796.3500.

U.S. Appl. No. 09/519,449, Diamond-Like Glass Thin Films.

U.S. Appl. No. 09/758,764, Self-Mating Reclosable Mechanical Fastener and Binding Strap.

U.S. Appl. No. 09/385,265, Capillary Collapse Resistant Microporous Material and Method.

U.S. Appl. No. 10/023,267, Plasma Treatment of Porous Materials.

* cited by examiner

LAYERED SHEET CONSTRUCTION FOR WASTEWATER TREATMENT

FIELD OF THE INVENTION

The present invention is, generally, an apparatus for substantial removal of organic substances and/or nitrogen sources from an aqueous medium containing organic substance(s) and/or nitrogen source(s). More particularly, it relates to an apparatus for the removal of organic substances and/or nitrogen sources from an aqueous medium by exposing the contaminated aqueous medium to the action of microorganisms supported on a water impermeable, gas permeable layer that is laminated to a gas delivery layer through which gas is supplied to the gas permeable layer such that it permeates the gas permeable layer and is supplied to the microorganisms on the gas permeable layer.

BACKGROUND OF THE INVENTION

Water treatment processes commonly utilize microbes, mainly bacteria, to produce enzymes that catalyze the degradation of unwanted, typically organic, material in water, this material being used as a fuel source by the microbes. Some standard processes for biological purification of wastewater are activated sludge, trickling filter, and rotary disk aeration processes and the like.

One problem common to these processes is that they require extremely large equipment because of their small treatment capacity per unit volume. Another problem with these known processes is that installation and operation of plants using such processes near residential districts is difficult because the apparatuses are usually not enclosed, which causes hygienic problems, such as offensive odors.

The activated sludge process suffers from other particular deficiencies. One such deficiency is that very intensive aeration is required with accompanying expense due to the great energy consumption. In addition, such aeration, or "sparging," is inefficient. A large percentage of the input gas is lost when the bubbles burst at the top of the aeration tank, unless capital-intensive recycling is used. Another disadvantage of the activated sludge process is that microbes are retained in the reactor for a maximum of a few hours and continually wasted. Yet another disadvantage is that the process requires the treated liquid, including the microbes that are removed with the liquid, to go to settling tanks where it remains for some time to allow the microbes to settle out of the liquid, and then is recycled back to the reactor.

Trickling filter and rotating disc processes utilize fixed biofilms grown on supports. These processes also suffer additional deficiencies. For example, the growth of the microorganisms sloughs off the surface of the supporting material because conditions at the supporting surface become anaerobic and the microorganisms at the surface of the supporting material are typically aerobic and need oxygen to live.

Another deficiency of apparatuses that have been made to treat wastewater is that they are not durable enough to resist puncture from debris or suspended solids in the wastewater. In addition, they are not efficient.

A need still exists for an apparatus for the treatment of wastewater or other liquid contaminated with organic substances and/or nitrogen sources using microorganisms that is durable and can withstand contact with debris and solids in the liquid. The need further exists for the apparatus to allow for support of a biofilm, or layer of microorganisms, that reduces sloughing off of the biofilm into the water. In addition, the need exists for the apparatus to be relatively small in size, enclosable, and efficient to manufacture and use.

SUMMARY OF THE INVENTION

The present invention provides an apparatus for substantially removing organic substances and/or nitrogen sources from an aqueous medium containing such substances. The layered sheet construction, including at least one water impermeable, gas permeable layer (referred to as "gas permeable layer"), a gas delivery layer attached to the gas permeable layer, and an optional microbial support layer, allows for gas, preferably an oxygen-containing gas, to be continuously supplied to the microorganisms that are located on the gas permeable layer or in and/or on the optional microbial support layer. Therefore, sloughing off of the layer of microorganisms is substantially reduced. The optional microbial support layer further reinforces attachment of the layer of microorganisms to the gas permeable layer. The gas permeable layer is durable. In some embodiments, the texture of the gas delivery layer further contributes to the durability of the apparatus by supporting the gas permeable layer and/or localizing any flooding that may occur if the gas permeable layer is punctured by suspended solids or debris in the wastewater. Additionally, the apparatus is small, enclosable, and easy and economical to manufacture.

One embodiment of the present invention is a layered sheet construction comprising: a) at least one gas permeable, water impermeable layer; and b) a gas delivery layer proximate said at least one gas permeable layer, wherein said layered sheet construction is used for the substantial removal of one or both of at least one organic substance and at least one nitrogen source from an aqueous medium containing one or both of at least one organic substance and at least one nitrogen source.

Throughout, the word "proximate" may be used interchangeably with the words "adjacent" and "in contact with."

Another embodiment is an apparatus comprising: a plurality of layered sheet constructions, comprising: i) at least one gas permeable, water impermeable layer; and ii) a gas delivery layer proximate said at least one gas permeable layer, wherein said layered sheet constructions are used for the substantial removal of one or both of at least one organic substance and at least one nitrogen source from an aqueous medium containing one or both of at least one organic substance and at least one nitrogen source.

Yet another embodiment is a process for the substantial removal of one or both of at least one organic substance and at least one nitrogen source from an aqueous medium containing one or both of at least one organic substance and at least one nitrogen source, comprising: a) providing at least one layered sheet construction, said layered sheet construction comprising: i) at least one gas permeable, water impermeable layer; and ii) a gas delivery layer proximate said at least one gas permeable layer; b) establishing a microorganism layer on said at least one gas permeable layer of said at least one layered construction; c) supplying at least one gas to said at least one gas delivery layer of said at least one layered construction; and d) contacting said aqueous medium with said microorganism layer.

Gas is transported through a gas delivery layer, to one major surface of the gas permeable layer, across the gas permeable layer by diffusion, and to a layer of microorganisms, which forms on the exterior surface of the gas permeable layer. It is also possible that an optional microbial support layer is attached to the exterior surface of the gas permeable layer, and that the layer of microorganisms (otherwise known as "microbial population," "microbial layer," or "biofilm") forms in and/or on the microbial support layer. Either the exterior surface of the gas permeable layer with the layer of microorganisms or the microbial support layer with the layer of microorganisms is contacted with the wastewater or aqueous medium including organic materials and/or nitrogen sources.

One advantage of at least one embodiment of the present invention is that the layer of microorganisms that forms in and/or on the inventive apparatus is aerated from the inside out, which provides better adhesion and reduces sloughing off and sludge production. In addition, due to the inside-out aeration, at least one embodiment of the present invention is well suited for the simultaneous action of aerobic microbes (which require high oxygen concentrations and relatively low organic concentrations) and anaerobic microbes (which require low oxygen concentrations and high organic concentrations). This may enable the treatment in a single step of compounds such as nitrogen-containing compounds and halogenated organic compounds, which typically require multiple steps using conventional treatment methods.

A further advantage of at least one embodiment of the present invention is that the apparatus is durable. One part of the apparatus that makes it durable is the gas permeable layer. Another part that makes the apparatus durable is the construction of the gas delivery layer. Also, the optional microbial support layer, when used, increases the durability of the apparatus by protecting the gas permeable layer from puncture.

Another advantage of at least one embodiment of the present invention is that the separate compartments, or flow channels, in the gas delivery layer allow for an elimination of complete flooding of the gas delivery layer if an area is punctured by debris or suspended solids in the wastewater or aqueous medium. If an area is punctured then possibly only one compartment or flow channel is flooded, rather than the entire gas delivery layer.

An additional advantage of at least one embodiment of the present invention is that internal condensation in the gas delivery layer of the apparatus that may develop is removed and not allowed to build up, which could hinder the performance of the apparatus.

Yet another advantage of at least one embodiment of the present invention is the use of a microbial support layer to reduce loss of microbes due to sloughing, and to provide enhanced control of the microbial layer thickness (and consequently the proportion of aerobic and anaerobic microorganisms present in the layer).

Another advantage of at least one embodiment of the present invention is that it may be constructed to provide a means for gas input to the apparatus but substantially no means for gas outlet other then the gas permeable layer. The gas then is consumed by the microbes. When the apparatus is operated in this manner, stripping of dissolved wastewater components to the stream and thereby to the atmosphere may be eliminated. Stripping of dissolved wastewater components to the atmosphere is often a problem in conventional wastewater treatment processes which commonly aerate the wastewater. This is a particular problem when treating water contaminated with volatile organic compounds (VOCs).

Another advantage of at least one embodiment of the present invention is that it makes efficient use of the gas that is provided through the gas delivery layer. It may use 100% or nearly 100% of the gas provided.

Another advantage of at least one embodiment of the present invention is that it is modular and well suited for small wastewater treatment processes, as well as the retrofitting of existing wastewater treatment facilities.

In this application:

"undulated" means having a wavelike form or appearance;

"corrugated" means having a shape of folds or parallel and alternating ridges and grooves;

"oleophobic" means repelling or tending not to combine with oil or grease;

"sheet construction" means having a construction in the form of a sheet, which is a broad, substantially flat mass having a continuous surface or surfaces;

"water impermeable" means being impermeable to liquid water under conditions of standard temperature and pressure; and "hydrophilic" means having a strong tendency to bind or absorb water.

DETAILED DESCRIPTION OF THE INVENTION

Apparatus

Figure 1:
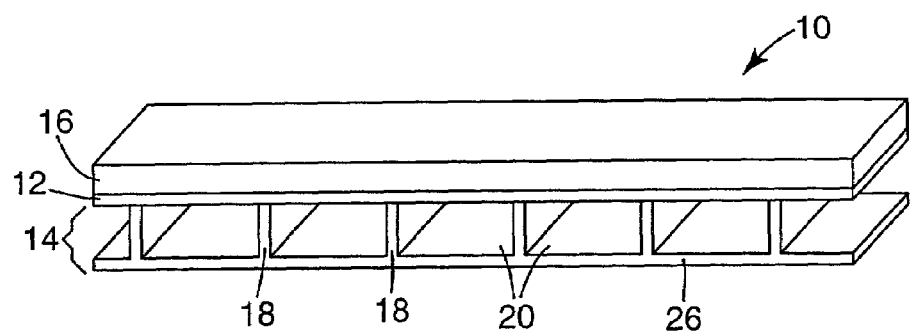
FIG. 1 is a perspective view of an embodiment of the present invention.

FIG. 1 shows the perspective view of an embodiment of the present inventive apparatus 10. The apparatus 10 comprises a gas permeable layer 12, a gas delivery layer 14, and an optional microbial support layer 16. The gas delivery layer 14 may comprise, as exemplified in FIG. 1, a base 26, walls 18, and flow channels 20, which allow for delivery of a gas, such as an oxygen-containing gas, to a major surface of the gas permeable layer 12. However, alternative constructions of the gas delivery layer are also contemplated by the present invention. The components shown in FIG. 1, as well as alternative and additional components, will be described in detail below.

Gas Permeable Layer

The gas permeable layer 12 of the present invention comprises a layer of gas permeable, water impermeable material. Preferably, the gas permeable layer is microporous having pore sizes that are less than about 0.5 micrometers. The preferred pore size maximum prevents the microbes in the microbial population from permeating the gas permeable layer and growing in the layer, which could negatively affect the performance of the inventive apparatus. However, it is possible that the gas permeable layer may have pore sizes that are 0.5 micrometers and larger. It is also possible that the gas permeable layer of this invention is substantially non-porous, but is nevertheless sufficiently permeable to the gas of interest, which is able to pass through the nonporous layer by diffusion.

Examples of materials that may be used for the gas permeable layer, having the preferred pore sizes, include polyethylene, polypropylene, and copolymers thereof; polysulfone, polyethersulfone, polyarylsulfone, and the like, and copolymers thereof; fluororesins including polytetrafluoroethylene, poly(vinylidene fluoride), and the like; and silicone-based materials including poly(dimethyl siloxane) and the like. Other materials may be used as well, as long as they are, or may be, made gas permeable and water impermeable.

The gas permeable layer may be made by any suitable technique or method that results in the gas permeable layer being gas permeable and water impermeable. One exemplary method of making the gas permeable layer is by the thermally induced phase transition (TIPT) processes, for example, which are described in detail in U.S. Pat. No. 4,539,256 (Shipman), U.S. Pat. No. 4,726,989 (Mrozinski), U.S. Pat. No. 4,867,881 (Kinzer), U.S. Pat. No. 5,120,594 (Mrozinski), and U.S. Pat. No. 5,238,623 (Mrozinski), which are incorporated herein by reference.

TIPT processes are particularly well suited for forming the gas permeable layer of the present invention. They are inexpensive manufacturing processes used to form semi-crystalline, flat sheet, microporous membranes. The flat sheet membranes meet the gas transfer and demanding durability requirements of the applications of the present invention. Routinely produced TIPT membranes have pore sizes in the range of 0.05 to 1.0 microns and air permeabilities in the range of 0.7 to 34.0 kg/m-h in water, which are sufficient for applications of the present invention.

An alternative gas permeable layer is one that may be made using a wet casting technique, such as in U.S. Pat. No. 3,432,585 (Watson et al.), which is incorporated herein by reference.

Alternatively, commercially available gas permeable, water impermeable membranes may be used as the gas permeable layer of the present invention. One example is a microporous membrane prepared by orientation of an extruded polyolefin film loaded with an inorganic filler, as described in U.S. Pat. Nos. 5,176,953 (Jacoby et al.), U.S. Pat. No. 5,236,963 (Jacoby et al.), and U.S. Pat. No. 5,317,035 (Jacoby et al.). Other examples of microporous membranes suitable for use as gas permeable layers in the present invention include those prepared from compositions comprising polypropylene or copolymers thereof and a beta-spherulite nucleating agent. (See, for examples, U.S. Pat. No. 5,134,174 (Xu et al.) and U.S. Pat. No. 5,317,035 (Jacoby et al.), and EP U.S. Pat. No. 0,492,942 (Jacoby et al.)). Many known methods exist for preparing microporous membranes suitable for use as the gas permeable layer of this invention (for a partial list of known methods, see U.S. Pat. No. 5,317,035 (Jacoby et al.)).

Because wastewater sometimes includes oil or grease, it may be desirable that the gas permeable layer be oleophobic. If the chosen material for the gas permeable is not in itself sufficiently oleophobic, oleophobicity may be improved by coating the gas permeable layer with a composition comprising a fluorochemical or fluoropolymer, that composition optionally being a curable composition. (See, for example, U.S. Pat. No. 5,989,698 (Mrozinski), which is incorporated herein by reference). Another method is fluorination of the gas permeable layer surface(s) utilizing ionizing radiation or a plasma discharge in the presence of a gaseous fluorinated species, such processes being well known in the art. (See, for example, R. d'Agustino, F. Cramarossa and S. De Benedictus, *Plasma Chemistry and Plasma Processing*, 4 (1984), 21–30). Yet another method is the addition of fluorochemical additives (which may or may not be polymeric) to the composition used to prepare the gas permeable layer. Examples of the use of fluorochemical additives for the preparation of TIPT membranes are provided in U.S. Pat. No. 5,260,360 (Mrozinski), U.S. Pat. No. 5,352,513 (Mrozinski), U.S. Pat. No. 5,690,949 (Weimer et al.), and U.S. Pat. No. 5,738,111 (Weimer et al.) (which are incorporated herein by reference). Another method to render the gas permeable layer nonwettable by oils, greases, or surfactants is to coat the porous, gas permeable layer with a thin, nonporous layer of a material having high gas permeability. One example of a suitable material for this purpose is polydimethylsiloxane. (See, for example, M. W. Reij, J. T. F. Keurentjes and S. Hartmans, *Journal of Biotechnology*, 59 (1998), 155–167, and references therein). Other processes may be used to render the gas permeable layer surface(s) oleophobic. Preferred methods will result in a surface energy of about 50 dyne/cm or less, or more preferably about 40 dyne/cm or less, or most preferably about 30 dyne/cm or less.

Optionally, the water impermeable material of the gas permeable layer may be hydrophobic. Or the gas permeable layer may be made of a material that was originally hydrophilic but was treated and made hydrophobic. This could be accomplished, for example, by fluorinating the surface(s) of the gas permeable layer (for examples of the methods that may be used to make a hydrophilic material hydrophobic, see the preceding paragraph).

Other possibilities for materials used to make the gas permeable layer are films that are substantially non-porous. Examples of materials which could be used to fabricate substantially nonporous films permeable to gases include silicone-based polymers and copolymers, as well as fluorinated polymers, of which one example is polytetrafluoroethylene. Other materials can be used. It is necessary that the chosen material be sufficiently permeable to the gas(es) to be delivered to the microbial population.

Figure 2:
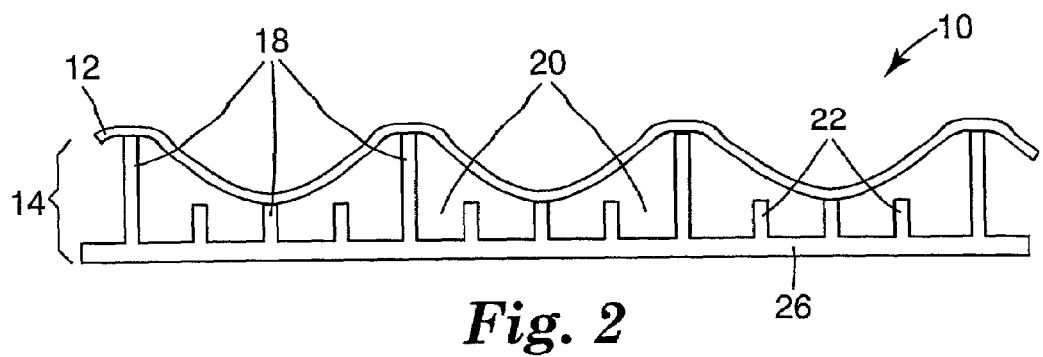
FIG. 2 is a side view of an embodiment of the present invention including an alternative undulated gas permeable layer.

Other embodiments of the present invention include gas permeable layers having shapes that increase their surface area per a given length. Alternative shapes of gas permeable layers, besides the flat layer shown in FIG. 1, are included in the present invention. One alternative gas permeable layer shape is an undulated gas permeable layer 12, as shown in FIG. 2. A gas permeable layer may be laminated to a gas delivery layer, which is discussed in the section below, in such a way as to present a periodically curved surface, providing an enhanced surface area for a given planar article size. Such a lamination might be carried out by joining (using, for example, a radiant heater) the gas delivery layer and the gas permeable layer as they contact each other within a curved orifice formed by adjacent convex and concave rolls; the convex roll supporting and bending the gas delivery layer such that the tops of the major walls are further apart from each other than in a flat, or unbent, position. Following lamination, flattening of the laminate would create a "dip" in the gas permeable layer between each pair of walls. Shorter or minor walls 22 may alternatively be included between the major walls 18 in order to prevent collapse of the undulated gas permeable layer against the gas delivery layer 14 under an applied external pressure. (See FIG. 2). However, FIG. 2 shows just one embodiment of the present invention, and other embodiments that increase the surface area of the gas permeable layer (relative to the gas delivery layer) are also possible. Also, other possible methods may be used to make the undulated shape, as well as other shapes, of the gas permeable layer.

Another example of an alternative shape of the gas permeable layer is a corrugated shape. This shape allows for an increase in the surface area of the gas permeable layer that is exposed to the contaminated aqueous medium.

Other alternative shapes of the gas permeable layer are also contemplated by the present invention.

Gas Delivery Layer

The gas delivery layer 14 of the present invention allows for the delivery of gas to the gas permeable layer to which the gas delivery layer is attached. The gas delivery layer of the present invention may have many different shapes, constructions, textures, etc.

In a preferred embodiment, the gas delivery layer may comprise a base 26 and a plurality of walls (or rails), or major walls 18, (as shown in FIG. 1) that form flow channels 20 through which a gas may be delivered to the interior surface of the gas permeable layer 12. These flow channels 20 through which a gas is delivered to the interior major surface of the gas permeable layer 12 may or may not extend all the way across the apparatus. It is possible that the flow channels have dead-ends. The flow channels also may have different shapes, such as a curved shape along the length or width of the layered sheet construction etc. Other shapes or configurations of the flow channels in the gas delivery layer are possible as long as the gas is able to be delivered to the gas permeable layer effectively.

Other configurations or textures of the gas delivery layer are possible besides having walls and flow channels. These other gas delivery layer constructions should allow the gas to be delivered to the gas permeable layer of the layered sheet construction. Some embodiments of the gas delivery layer may be made of porous and gas permeable materials. For example, the gas delivery layer could comprise a foam, which is preferably rigid and/or polymeric and/or open-celled. Further examples of the material comprising the gas delivery layer would be fabric, porous articles, non-wovens, etc. Foams, fabrics, porous articles, wovens or non-wovens that may be used for the gas delivery layer should be sufficiently permeable to allow the gas to move through the layer. The gas should be able to move along the gas delivery layer as well as up to the gas permeable layer so that it may diffuse through the gas permeable layer to the layer of microorganisms. In general, the gas delivery layer must be able to effectively deliver a gas to the gas permeable layer.

The shapes of walls of the gas delivery layer, if there are walls, may alternatively incorporate additional texture or shape that may affect the flow of the gas within the gas delivery layer. In addition, some texture in the gas delivery layer could be used to separate the gas flow from moisture condensation in the gas delivery layer.

The gas permeable layer is attached or laminated to the gas delivery layer, or vice versa. The area(s) where the two layers are attached depends upon the texture or configuration of the gas delivery layer. For example, in FIG. 1, the gas permeable layer 12 is attached to the gas delivery layer 14 on the tops of the plurality of walls 18 that are part of the gas delivery layer 14. In FIG. 2, the gas permeable layer 12 is attached to the gas delivery layer 14 at the tops of the plurality of major walls 18, but not the minor walls 22. In general, the gas delivery layer and gas permeable layer must be attached to or proximate one another so that the gas that passes through the gas delivery layer is able to be passed to and diffuse through the gas permeable layer.

Contributing to the economical manufacture of the inventive apparatus is the economical production of the gas delivery layer. A gas delivery layer that comprises a texture that includes flow channels, for example as in FIG. 1, may be economically fabricated in a continuous fashion by profile extrusion. The economical application of profile extrusion to produce textured films is described in U.S. Pat. No. 5,077,870 (Melbye et al.), U.S. Pat. No. 3,586,220 (Reinsberg), and U.S. Pat. No. 4,894,060 (Nestegard), and in Assignee's Co-pending Patent Application having U.S. Ser. No. 09/758,764 (which are all incorporated herein by reference). Other processes may also be used to produce the gas delivery layer, including flow channels, of the present invention. One example is microreplication, comprising the steps of (a) providing a production tool which can be cylindrical and which comprises a plurality of geometric concavities and corresponding peaks on its surface; (b) extruding a molten polymer film onto the tool in excess of the amount required to completely fill the cavities, thus substantially filling the cavities, the excess forming a layer of polymer overlying the cavities and the surface around the cavities; (c) cooling the polymer film, thus allowing it to solidify and preserving a permanent surface texture correspondent with that of the production tool; and (d) continuously stripping from the tool the solidified polymer (see, for example, WO 99/65664 (Bentsen et al.) and U.S. Pat. No. 5,077,870 (Melbye et al.), U.S. Pat. No. 5,679,302 (Miller et al.), and U.S. Pat. No. 5,792,411 (Morris et al.), which are incorporated herein by reference).

Another example of a way to make the gas delivery layer is the cast and cure process, comprising the steps of (a) preparing a coatable composition comprising a curable organic resin; (b) providing a production tool comprising a plurality of geometric concavities and corresponding peaks on its surface; (c) coating the coatable composition onto the production tool, thus substantially filling the concavities; (d) optionally contacting a backing material with the coatable composition on the production tool; (e) exposing the composition to conditions sufficient to cure the resin of the composition; and (f) removing from the production tool the cured composition, providing a film having a surface texture correspondent with that of the production tool and optionally adhered on the non-textured side to a second polymeric film (i.e. a thermoset film) (See, for example, U.S. Pat. No. 5,743,981 (Lu), which is incorporated herein by reference).

The methods used to make other possible gas delivery layers, such as foams, porous materials, wovens, and nonwovens, are many and varied, and are known in the art.

Materials that may be used to construct the gas delivery layer are numerous, and depend upon the form (e.g. cast and cured films, wovens, nonwovens, foams) of the gas delivery layer. For a gas delivery layer, such as the one shown in FIG. 1, thermoplastic polyolefins including, but not limited to, polypropylene and copolymers thereof; polyethylene and copolymers thereof, and the like, are examples of materials that may be used to construct the gas delivery layer.

The construction of the gas delivery layer in the present invention may contribute to the durability of the invention. For example, the separate flow channels of the gas delivery layer in FIG. 1 allow for an elimination of complete flooding of the apparatus if an area is punctured. If an area of the gas delivery layer of the present inventive apparatus is punctured by debris in the contaminated aqueous medium, the separate channels make it possible that only one or a very small number of flow channels of the gas delivery layer may be flooded. This allows the damage from a puncture to be localized. This is in contrast to the use of conventional flat-sheet type membrane module constructions for membrane separations and membrane processes for fluid-fluid contact, wherein the passage-forming layers providing for the delivery of gases and liquids to the gas permeable surfaces are screens, porous felts, or fabrics (see, for example, U.S. Pat. No. 6,068,771 (McDermott et al.)). Puncture of the gas permeable layer of such a construction would lead to flooding of the entire gas delivery layer. Flooding of the entire gas delivery layer would disable the apparatus.

The gas delivery layer may also serve to provide durability or sturdiness to the inventive apparatus in other ways, which are also contemplated by this invention.

Figure 3:
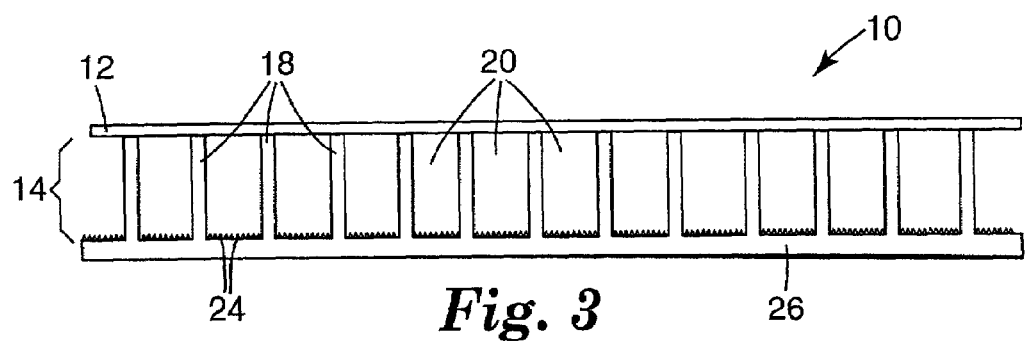
FIG. 3 is a side view of another embodiment of the present invention, including microchannels in the flow channels of the gas delivery layer.

As shown in FIG. 3, the gas delivery layer 14 may alternatively include a multiplicity of microchannels 24 in its base 26. The microchannels 24 run down the flow channels 20 about parallel to the major walls 18 and are disposed between them, in a preferred embodiment. The microchannels 24 preferably would have a hydraulic radius no greater than about 300 micrometers. These microchannels 24 would serve to wick away condensation that may form on the inside of the gas delivery channels during operation. The moisture that has condensed and wicked down the channels may then be removed in some way. The fabrication of such microchannels and the use of passive fluid transport is the subject of WO 99/65542 (Insley et al.), which is herein incorporated by reference.

If the gas delivery layer, including its microchannels, is made of a predominantly hydrophobic polymer (e.g. polyolefin), then it may not function to wick away the water that condenses in the gas delivery layer. Therefore, it may be desirable to make all or a part of the gas delivery layer hydrophilic for improved water transport. This may be done, for example, by coating the gas delivery layer with a hydrophilic composition, or by blending a surfactant with the base polymer when making the gas delivery layer as described in WO 99/65542 (Insley et al.). Other known processes may be used as well.

Incorporating microchannels in the flow channels, as in FIG. 3, is just one means for removing moisture from inside the gas delivery layer. Other configurations of removing moisture from the gas delivery layer are possible and considered to be a part of the present invention. One such method applicable to a "dead end" module (a module having a means for gas input, but substantially no means for gas escape other than the gas permeable layer) would be the coating or chemical treatment of a region of the gas permeable layer adjacent to the sealed ends of the flow channels (like those in FIG. 3) to render it hydrophilic. (See, K. Brindle, et al., *Water Environment Research*, 71 (6), pp. 1197–1204 (1999)). Back pressure in the channels would cause any condensation to flow to the channel ends, where it could be removed to the exterior of the module by permeating the hydrophilic region of the gas permeable layer. (Use of this method would require the continuous application of an internal pressure in the flow channels sufficient to prevent permeation of the hydrophilic region of the gas permeable layer by water from outside the module).

Alternatively, the module could comprise a gas delivery layer with flow channels open at both ends to provide a means for gas input at one end and a means for gas removal at the other end. To remove any condensation forming on the interior of the flow channels, the gas delivery layer could have channels that are sufficiently small so that any condensed water that forms a bead is then pushed out of the channel by the pressure of the gas that is provided to the gas delivery layer.

Figure 4:
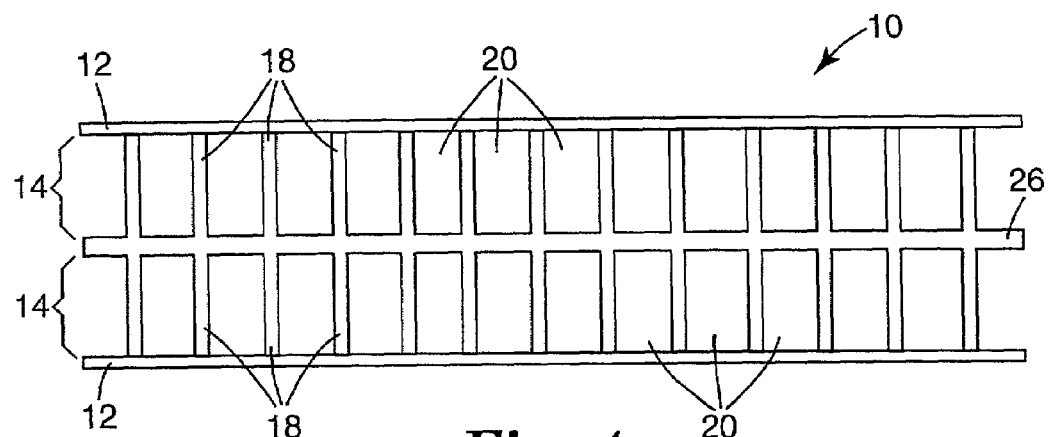
FIG. 4 is a side view of an embodiment of the present invention, which comprises a dual gas delivery layer.

Another alternative embodiment of the present invention includes a double or dual gas delivery layer. (See FIG. 4). Such a dual gas delivery layer, as shown in FIG. 4, may be constructed by laminating two gas delivery layers 14 together (base 26 to base 26), to form one base, resulting in a composite structure that ultimately has gas permeable, water impermeable layers 12 attached to both gas delivery layers. Example 2 below describes in more detail how this lamination is done. Another possible method of producing a dual gas delivery layer is by a single step profile extrusion method through a dual-featured die. (See Example 3 below).

Another possible embodiment of the present invention would have a single gas delivery layer with gas permeable layers on each of two major surfaces. For example, if the gas delivery layer comprises a sturdy foam, two gas permeable layers may be attached to two major surfaces of the foam (in a flat sheet-like form, for example). In that case, the gas delivery layer (foam) may be durable and sturdy enough to provide support to the gas permeable layers. This construction would allow for treatment of contaminated water on both sides of the composite apparatus.

Optional Microbial Support Layer

Optionally, the inventive apparatus further comprises a microbial support layer 16 that is proximate, or connected to, the gas permeable layer.

The optional microbial support layer may comprise a fibrous or porous interior structure presenting a surface for microbial adhesion and support. Suitable support layers include polymeric or nonpolymeric nonwoven webs made of constructions, including, for example, air-laid, carded, stitch-bonded, spunbonded, spunlaced, ultrasonically bonded, wet laid, or melt blown constructions. Other useful microbial support constructions include woven and knitted materials, as well as foams and porous ceramics. Foams suitable for use as microbial support layers include those prepared by polymerizing high internal phase emulsions (HIPEs), as described in U.S. Pat. No. 5,899,893 (Dyer et al.), U.S. Pat. No. 6,147,131 (Mork et al.), and U.S. Pat. No.

6,274,638 (Yonemura et al.), and in WO 01/21693 (Thunhorst et al.), which are incorporated herein by reference. Many materials may be used as the microbial support layer, provided the materials provide the proper characteristics necessary for microbial support and attachment.

Another method of fabricating a microbial support layer useful in this invention is the fibrillation or microfibrillation of a highly oriented, melt-processed polymeric film by the application of fluid energy to at least one side of said film, as described in U.S. Pat. No. 6,110,588 (Perez et al.) and WO 00/68301 (Swan et al.), which are incorporated herein by reference.

The microbial support layer may be designed to have an open cell size that is suitable for microbial ingrowth ("microbial ingrowth" means the act of microbes growing or forming inward, which in this case is into the microbial support layer). Often, it will be desirable that the support layer be hydrophilic so that it is wetted by the aqueous solution. If the microbial support layer is prepared from a hydrophobic polymer (e.g. a polyolefin), it can be made hydrophilic. One method to render a hydrophobic support hydrophilic is described in concurrently filed and co-pending U.S. Pat. No. 6,878,419, which is incorporated herein by reference. Another method of rendering a hydrophobic support hydrophilic is coating the web with a hydrophilic polymer as described, for example, in U.S. Pat. No. 6,042,877 (Lyon et al.) (which is incorporated herein by reference) (other coating methods may be used as well). Another method is the surface graft polymerization of hydrophilic polymer chains onto the support using ultraviolet or ionizing radiation, plasma discharge, or ozone treatment in the presence of a hydrophilic monomer, methods for which are well known in the art. (See, for example, H. Yamagishi, J. V. Crivello and G. Belfort, *Journal of Membrane Science*, 105 (1995), 237–247). Yet another method to prepare a hydrophilic support layer predominantly from a hydrophobic material is incorporation of a surface-active additive having a hydrophilic chemical group into the base polymer. Surface-active additives useful for this purpose include fluoroaliphatic-group containing nonionic surfactants, polyoxyethylene group-containing nonionic surfactants, and fatty acid monoglycerides. Examples of the use of such additives to prepare hydrophilic, fibrous materials of the type suitable for the present invention are provided in WO 97/44508 (Temperante et al.) and WO 00/71789 (Dunshee et al.) (which are incorporated herein by reference). Many suitable surface-active additives are available, and the above list is intended to be exemplary only. Hydrophilic support layers can also be prepared using a sheath-core blown microfiber construction (see, for example, WO 00/43579 (Lindquist et al.), which is incorporated herein by reference). Using this method, a nonwoven support can be constructed from fibers having an inner core comprising a predominantly hydrophobic material and an outer sheath comprising a hydrophilic polymer or a hydrophilic, surface-active additive.

Alternatively or additionally, the support layer may be loaded with hydrophilic and/or absorptive filler materials. The function of such a filler material is to improve the water absorbing capacity of the support layer, absorb and concentrate organic carbon sources present in the environment and thereby aid in the development of a microbial population, and/or present surface chemical groups favorable for microbial attachment and adhesion. Useful absorptive filler materials may include natural materials containing finely-divided fossil lignocelluloses or the secondary products thereof (e.g. peat, lignite, mineral coal, coke, charcoal), activated carbon, finely-divided distillation residues, granular metal oxides, inorganic fillers, plastic particles, or mixtures thereof. This list of adsorptive filler materials, however, is not exhaustive, and the present invention contemplates other filler materials as well.

In addition, the support layer may have a surface chemistry favorable for microbial attachment and/or adhesion, or may be loaded with particles, fibers or resins having such a surface chemistry. For example, as most bacteria have a net negative surface charge, the support layer could preferably carry a permanent, positive surface charge. Examples of materials carrying a net positive surface charge which might be used to fabricate a microbial support layer include polyurethane resins having built-in cationic or cation-forming chemical groups. The support layer can be loaded with a positively-charged material. (For example, an anion exchange resin). A surface chemistry favorable for microbial attachment and/or adhesion can also be provided by coating an existing microbial support with a composition comprising such a surface chemistry. Positively-charged polymers which might be used to coat the web include polyglucosamines and polyamines. One method that could be used to coat these positively-charged polymers onto a microbial support layer is described in U.S. Pat. No. 6,042,877 (Lyon et al.) (which is incorporated herein by reference). Yet another method to provide a support with a surface chemistry favorable for microbial attachment and/or adhesion is the addition of a surface-active additive comprising such a surface chemistry to the base polymer used to fabricate the support. If the microbial support is a nonwoven, this can be done using a sheath-core construction, wherein the outer sheath of the microfiber contains the surface-active additive.

Advantages to the use of a charged microbial support layer and/or the incorporation of adsorptive particles in the support layer include: 1) reduction of the time required to establish the microbial population at process startup; and 2) better adhesion of the microbial population resulting in reduced sloughing of the biofilm and reduced sludge production. U.S. Pat. No. 4,576,718 (Reischel et al.) describes the incorporation of such fillers in polyurethane foams to fabricate microbial carriers for wastewater treatment. A discussion of the incorporation of surface charge and absorptive fillers into such carrier material is presented in J. T. Cookson, Jr., Bioremediation Engineering: Design and Applications, New York: McGraw-Hill, Inc., 1995. In contrast to the present invention, the delivery of oxygen to microbes supported in these carriers is limited by diffusion into the carrier from the surrounding water and is therefore slow and uncontrolled.

An added advantage of the support layer is that it may also increase the durability of the present invention by protecting the gas permeable layer from tearing and puncture.

The thickness of the support layer may be any thickness that is functional. The thickness of the support layer may allow for control of the thickness of the microbial population that adheres to and grows within and/or on the support layer. This may be preferred to controlling the thickness of the microbial population by adjusting the reactor flow conditions alone, which is also a possibility.

Gas

One or more gases may be delivered to the gas delivery layer of the present invention. Examples of gases that are deliverable using the present invention comprise air, oxygenated air, pure oxygen, methane or other hydrocarbon gases, and mixtures of any of these. Other gases, however, are also contemplated by the present invention.

There are many suitable ways of delivering or supplying gas to the gas delivery layer. One possibility is to deliver gas by leaving the ends of the gas delivery layers open to the air. Another possibility is to force gas into the ends of the gas delivery layer. Gas may be fed to the ends of the gas delivery layers by using a manifold that is attached to the ends of a plurality of gas delivery layers in a wastewater treatment module apparatus, for example.

Gas is transported from a gas supply source through the gas delivery layer (actually the texture, flow channels or pores etc. of the gas delivery layer) to the interior surface of the gas permeable layer, through the gas permeable layer by diffusion and to the microbial population, which forms on the exterior surface of the gas permeable layer or, optionally, on and/or in the microbial support layer that is attached to or proximate the exterior surface of the gas permeable layer.

Using the present invention, gas, such as oxygen, can be provided to the microbial population layer at concentrations up to 100 percent. The gas can be provided directly to the microbial population without the occurrence of prior dissolution in the liquid phase.

Microbial Population

The microbial population of the present invention may comprise aerobic microorganisms. The microbial population may also comprise a mixed culture of aerobic and anaerobic microorganisms that provide effective treatment of an aqueous medium contaminated with an organic substance(s) and/or a nitrogen source(s). The mixed culture is preferred and may degrade a variety of organic compounds and nitrogen sources that are not well removed by aerobic treatment alone.

Exemplary microorganisms useful in wastewater treatment using the present invention include *Bacillus, Arthrobacter, Nitrosomonas*, and *Nitrobacter* bacteria (See, J. T. Cookson, Jr., Bioremediation Engineering Design and Application, New York: McGraw-Hill, Inc., 1995). Many other microorganisms may be used with this invention, and the possibilities are not limited to those disclosed herein. Microorganisms used in wastewater treatment applications typically originate from, and are naturally indigenous to, the wastewater or contaminated water source. In some cases, seed bacteria are added to the water (or aqueous medium) in order to speed the development of a biofilm on a support material or in an attempt to control the composition of the microbial population.

If the microbial population comprises both aerobic and anaerobic bacteria, the aerobic bacteria will tend to be located closer to the gas permeable layer (away from the aqueous medium), while the anaerobic bacteria will tend to be located toward the exterior of the microbial population and towards the aqueous medium containing the organic substances and/or nitrogen sources.

Exemplary Modules (Apparatuses)

The inventive apparatus may be assembled by placing the gas permeable layer proximate the gas delivery layer. The microbial support layer may then, optionally, be placed proximate the gas permeable layer on the side of the gas permeable layer that is opposite the gas delivery layer. The components of the inventive apparatus may alternatively be affixed or attached to one another through various means, such as lamination, adhesive bonding, thermal bonding, ultrasonic bonding, pressure bonding, chemical bonding, etc. The components may alternatively be laminated together around their edges. Other methods of assembling the inventive apparatus are also contemplated by the present application.

Figure 6:
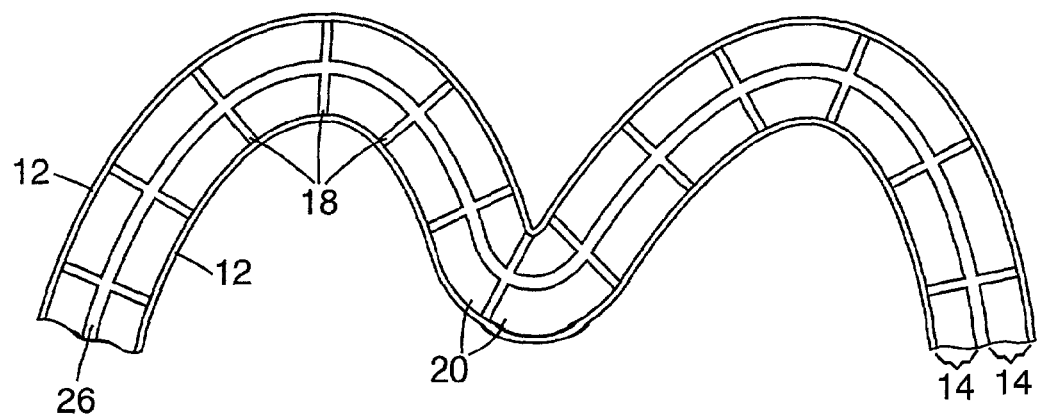
FIG. 6 is a side view of an embodiment of the present invention, which is undulated and which comprises a dual gas delivery layer.

A plurality of the inventive layered sheet constructions, as described above, may be incorporated into an apparatus, or module, for use in substantially removing organic sources and/or nitrogen sources from an aqueous medium. It is possible that a plurality of layered sheet constructions may be shaped into other shapes other than just flat sheets. For example, FIG. 6 shows a layered sheet construction, having a dual gas delivery layer, that is undulated. Alternatively, the layered sheet construction could be corrugated. Such shapes may be used to increase the surface area of the apparatus that is exposed to the contaminated water. This increases efficiency.

Figure 7:
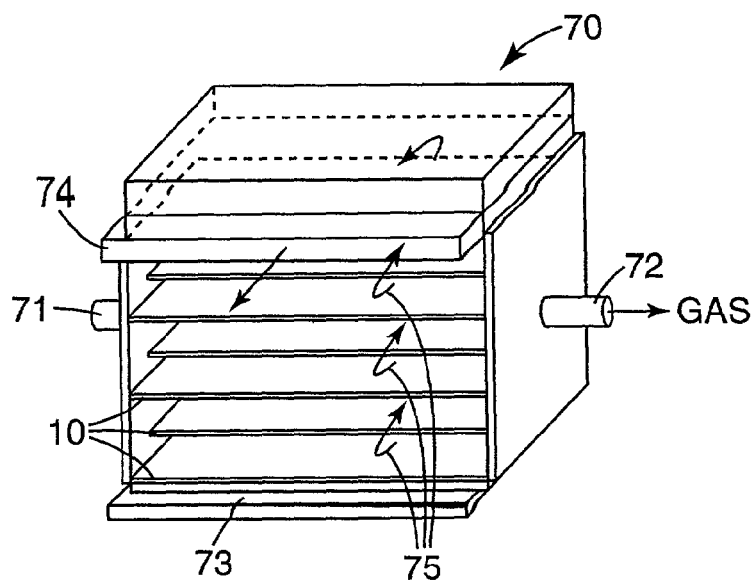
FIG. 7 is a perspective view of an exemplary module incorporating embodiments of the inventive apparatus.
Figure 8:
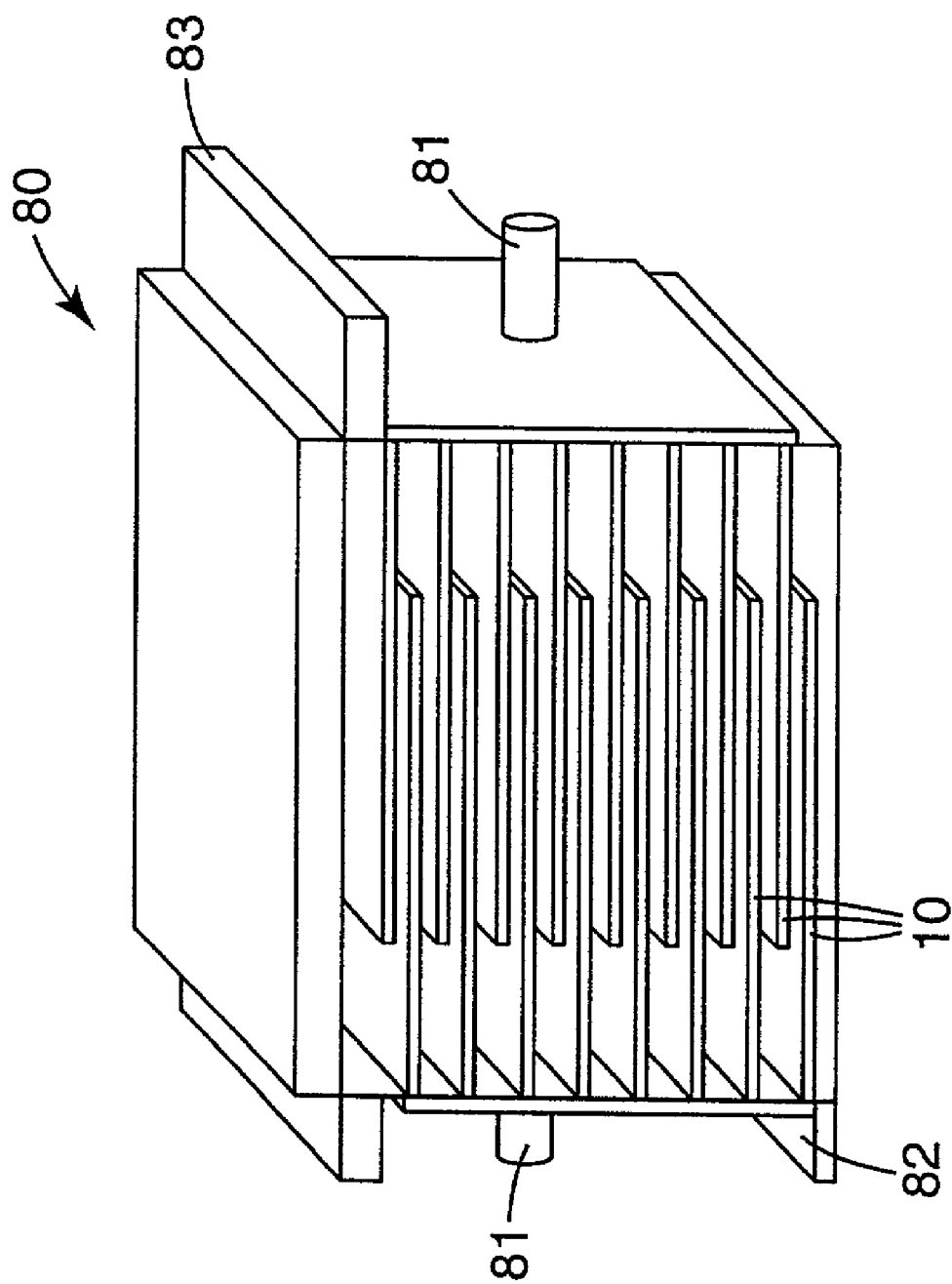
FIG. 8 is a perspective view of another exemplary module or apparatus incorporating embodiments of the inventive apparatus.
Figure 9:
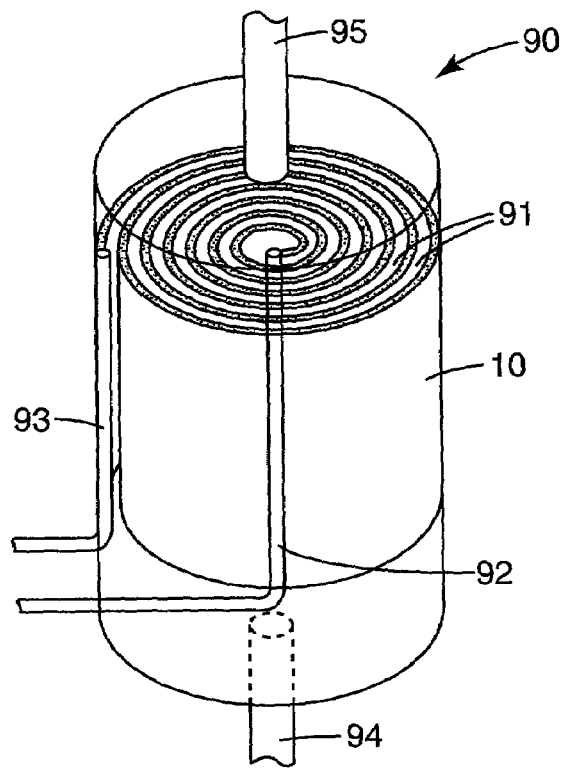
FIG. 9 is yet another perspective view of an exemplary module or apparatus incorporating embodiments of the inventive apparatus.

Some exemplary apparatuses or modules incorporating one or a plurality of layered sheet constructions are illustrated in FIGS. 7–9.

FIG. 7 shows one exemplary wastewater treatment module. The wastewater treatment module 70 comprises a plurality of layered sheet constructions 10, as described herein above. The layered sheet constructions 10 preferably comprise dual gas delivery layers with gas permeable layers on each side (top and bottom). This provides the most efficient wastewater treatment, as it allows more surface area of the biofilms that form on the apparatuses 10 to be exposed to wastewater that flows through the module in FIG. 7.

As can be seen in FIG. 7, gas enters the gas inlet 71, passes through the layered sheet constructions 10 and out the gas outlet 72, if there is any gas left to flow out of the module. Although in many cases most of the gas will be delivered to the microbial layer formed on and/or in the layered sheet constructions 10, it may be desirable to have the gas pass out the other ends of the layered sheet constructions 10 so that the gas may carry gaseous by-products of the action of the microbes, for example, out of the module 70. The contaminated water entry area is shown by 73, with the exit area for the treated water being shown as 74. The flow of the water (or aqueous medium) through the module is shown by the arrows marked as 75.

FIG. 8 is another exemplary wastewater treatment module 80. It is similar to the module shown in FIG. 7. However, in the module shown in FIG. 8, the plurality of layered sheet constructions 10 are in dead-end mode, meaning the gas cannot flow from one set of ends of the layered sheet constructions 10 to the other ends and out of the module or apparatus 80. This may also be desired so that no by-products are carried out into the atmosphere (such as VOCs). The gas inlet is shown as 81. The contaminated water entry area is shown as 82 while the exit area for the treated water is shown as 83. It is possible with the module in FIG. 8, as well as the module in FIG. 7, that the treated water from the exit areas may be recycled back through to the entry area to be treated a second time or multiple times.

FIG. 9 shows yet another exemplary wastewater treatment module 90. The apparatus shown in the Figure is tubular in shape. It includes one layered sheet construction 10 that is wound into a spiral helix having successive winds spaced apart to form a gap 91. The gap 91 allows the wastewater or contaminated water to flow through the gap 91 and be exposed to the microbes on and/or in the layered sheet construction. Spacers or passage-forming material may be optionally used to keep the gap open. The gap 91 preferably is sufficiently big to allow suspended solids that may be in the wastewater to flow through the gap. Gas may be provided to the layered sheet construction 10 either from the end of the layered sheet construction that is in the inside of the spiral 92, or alternatively the gas may be provided to the end of the layered sheet construction 10 that is on the outside of the spiral 93. Another alternative would be to provide gas to both ends 92, 93. The contaminated water entry area is shown as 94, while the exit area is shown as 95.

Process

Another embodiment of the present invention is a process for the substantial removal of one or both of at least one organic substance and at least one nitrogen source from an aqueous medium containing one or both of at least one organic substance and at least one nitrogen source, comprising: a) providing at least one layered sheet construction, said layered sheet construction comprising: i) at least one gas permeable, water impermeable layer; and ii) a gas delivery layer proximate said at least one gas permeable layer; b) establishing a microorganism layer on said at least one gas permeable layer of said at least one layered construction; c) supplying at least one gas to said at least one gas delivery layer of said at least one layered construction; and d) contacting said aqueous medium with said microorganism layer.

EXAMPLES

Features and advantages of this invention are further illustrated in the following Examples, It is to be expressly understood, however, that the particular ingredients and amounts used as well as other conditions and details are not to be construed in a manner that would unduly limit the scope of this invention.

Test Methods

Scanning Electron Micrographs (SEMs)

SEMs were taken with a JEOL™ Model 840 SEM (Peabody, Mass.). Samples were sputter coated with either gold or a gold/palladium (60/40) mixture and the sample surface was imaged at a voltage of 10 kilovolts (kV) and at magnifications between 250 and 1000 times (250–1000×.).

Example 1

Example 1 illustrates an apparatus of the invention that was made by forming a gas delivery layer and affixing a gas permeable layer to the textured surface of the gas delivery layer.

A melt processable ethylene-polypropylene copolymer (7C55H available from Dow Chemical, Midland, Mich.) was fed into a single screw extruder (supplied by Davis Standard Corporation, Pawcatuk, Conn.) to form a gas delivery layer having one smooth surface (base layer) and one textured surface. The extruder had a diameter of 6.35 centimeters (cm) (2.5 in), a length/diameter (L/D) ratio of 24/1, and a temperature profile that steadily increased from approximately 177 to 232° C. (350 to 450° F.). The polymer was continuously discharged at a pressure of at least 689 kPa (100 psi) through a neck-tube heated to 232° C. (450° F.) and into a 20.32 cm (8 in.) wide MASTERFLEX™ LD-40 film die (supplied by Production Components, Eau Claire, Wis.), maintained at a temperature of 232° C. (450° F.). The die had a die lip configured to form a polymeric base sheet having a smooth surface on one side and, on the opposite side, a textured surface formed of evenly spaced textured features shaped as wall-like or rail-like protrusions extending perpendicularly from the base portion. This construction is illustrated in FIG. 1. The base layer of the gas delivery layer had a thickness of about 127 microns ($\mu m$) (5 mils). Each wall extended in the machine direction down the base sheet and had a height of 1.5 mm (60 mils), a width of 0.5 mm (18 mils) and a center-to-center spacing of 1.0 mm (40 mils). The gas delivery layer was drop-cast at 3.5 m/min (10 ft/min) onto a gas permeable layer (137 microns thick, polypropylene, Gurley densometer reading of 10 seconds per 50 cc, 75% void, prepared according to the method taught in U.S. Pat. No. 5,238,623 (Mrozinski)) such that the tops of the walls of the gas delivery layer contacted the gas permeable layer. Contact was for a period of about 0.5 seconds over a contact distance of about 20 mm (0.8 in) before the gas delivery layer and gas permeable layer combinations were fed directly into a quench tank maintained at 16° C. (60° F.) for a residence time of about 10 seconds to form a united construction. The contact was sufficient for the tops of the walls of the gas delivery layer to bond to the gas permeable layer (without melting through) before being quenched. The quench-medium used was water with about 0.1% by weight of a surfactant, ETHOXY™ CO-40 (a polyoxyethylene castor oil available from Ethox Chemicals, LLC, Greenville, S.C.) to increase wetting of the hydrophobic polypropylene gas delivery layer. The quenched construction was then air-dried and collected in a roll. The construction had a weight of approximately 630 $g/m^2$.

Example 2

Example 2 illustrates a gas delivery layer having textured features (walls) on both sides (a dual gas delivery layer).

A gas delivery film was made in a manner similar to Example 1 except the smooth surface of the gas delivery layer (surface without the walls) was melt-affixed to the smooth surface of another previously made gas delivery layer. The dual gas delivery layer that resulted is like that one shown in FIG. 4 and had a base thickness of about 355 $\mu m$ (14 mils). Each wall that extended from the base had a height of 1.2 mm (46 mils), a width of 0.4 mm (16 mils) and a center-to-center spacing of 1.0 mm (40 mils).

The resulting gas delivery layer was suitable for adhering gas permeable layers to both textured surfaces (walls) by lamination techniques to make a layered sheet construction having two surfaces on which to grow biofilms.

Example 3

Example 3 illustrates another method of making a gas delivery layer having textured features on both sides (dual gas delivery layer).

Figure 5:
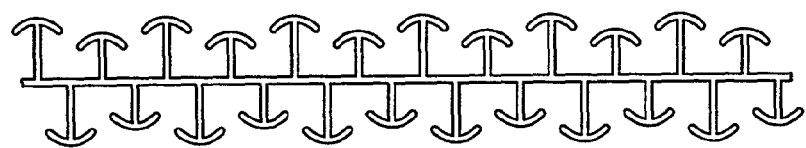
FIG. 5 is a side view of an embodiment of the invention that was made/used in Example 3, which has hook-like protrusions from the walls of the gas delivery layers.

A gas delivery layer was made in a manner similar to Example 1 except the extruder film die was configured to form walls, with hook-like protrusions, that extended about perpendicularly from both surfaces of the base layer of the gas delivery layer, as shown in FIG. 5. The dual gas delivery layer that resulted was drop-cast into a water bath to quench it. The dual gas delivery layer had a base thickness of about 254 $\mu m$ (10 mils). Each wall that extended from the base had a height that alternated between 1.0 mm (40 mils) and 0.7 mm (27 mils), a width of 178 $\mu m$ (7 mils) and a center-to-center spacing of 1.3 mm (50 mils). The hook-like protrusions at the end of each wall had widths of 0.7 mm (28 mils). The wall position on one surface were staggered when compared with the positions of the walls on the other surface such that one wall on the first surface was positioned midway between two walls on the second surface.

Example 4

This example illustrates the fabrication of a high surface area, microbial support layer suitable for lamination to a gas permeable layer of this invention to provide enhanced anchorage of a microbial population adjacent to the gas permeable layer.

Nine samples of blown microfiber web loaded with activated carbon were made with three different basis weight fiber webs and various carbon content in a manner similar to that disclosed in U.S. Pat. No. 3,971,373 (Braun) (which is incorporated herein by reference). The polymer was a polypropylene available as FINA™ 3960 from Atofina Chemicals, Inc., Philadelphia, Pa. Activated carbon particles with a mesh size of 80×325 (ASTM U.S. Sieve Number) were supplied by Calgon Carbon Corporation, Pittsburgh, Pa. The fibers had an effective fiber diameter of about 11 microns. Unloaded basis weight in grams per square meter (gsm), loaded basis weight in gsm, activated carbon concentration in weight percent (wt %), activated carbon basis weight in gsm and inter fiber spacing are listed in Table 1 for each sample.

TABLE 1

| Sample | Unloaded gsm | Loaded gsm | Carbon wt % | Carbon gsm | Spacing μm |
|---|---|---|---|---|---|
| 4A | 30 | 45 | 33 | 15 | 50 |
| 4B | 30 | 58 | 48 | 28 | 50 |
| 4C | 30 | 120 | 75 | 90 | 50 |
| 4D | 60 | 84 | 29 | 24 | 50 |
| 4E | 60 | 105 | 43 | 45 | 50 |
| 4F | 60 | 130 | 54 | 70 | 50 |
| 4G | 90 | 120 | 25 | 30 | 50 |
| 4H | 90 | 152 | 41 | 62 | 50 |
| 4I | 90 | 180 | 50 | 90 | 50 |

Example 5

This illustrates a microbial support layer that has been treated to enhance hydrophilicity.

Sample 4F was surface modified by applying a hard coating to the activated carbon loaded, microbial support layer (nonwoven web in this example). The nonwoven web was secured in a batch glow discharge reactor. The reactor was closed and evacuated, and the sample was then sequentially exposed to an oxygen plasma for 10 seconds, a tetramethylsilane plasma for 30 seconds, and a second oxygen plasma for 10 seconds. All plasma exposures were carried out at a gas pressure of 20.0 Pascals (Pa) (150 mTorr) and a glow discharge power of 300 Watts (W) as the sample passed through an ion sheath around a powered electrode. The sample was then flipped over and the process was repeated on the opposite side.

A droplet of water that was placed on the resulting nonwoven web exhibited a complete wetting-out on the treated polymeric surface. This is in contrast to an untreated sample, upon which a droplet of water formed a finite contact angle.

Example 6

This illustrates the growth of a biofilm or microbial layer, on a hydrophobic gas permeable layer by trans-membrane oxygenation.

A wastewater test medium was prepared. Phosphate buffered saline (PBS) was prepared at 0.01 M and pH 7.4 by the addition of prepackaged buffer salts (available as Catalog No. P-3813 from Sigma-Aldrich, Milwaukee, Wis.) to deionized water. Stock Solution A, B and C were made with compositions shown in Table 2 in deionized water. Minimal salts medium was prepared based on Environmental Protection Agency (EPA) guidelines, by adding 1 ml each of Stock Solution A, B, and C to 1 liter of PBS. Test medium base solution was then prepared by adding to the minimal salts medium 100 mg phenol per liter of solution (present as a carbon source).

TABLE 2

| Stock Solution | Compound | Concentration g/L |
|---|---|---|
| A | ammonium chloride | 35 |
| | potassium nitrate | 15 |
| | potassium hydrogen phosphate trihydrate | 75 |
| | sodium dihydrogen phosphate monohydrate | 25 |
| B[1] | potassium chloride | 10 |
| | magnesium sulfate | 20 |
| | iron(II) sulfate heptahydrate | 1 |
| C | calcium chloride | 5 |
| | zinc chloride | 0.05 |
| | manganese(II) chloride tetrahydrate | 0.5 |
| | copper(II) chloride | 0.05 |
| | cobalt (II) chloride | 0.001 |
| | boric acid | 0.001 |
| | molybdenum(VI) oxide | 0.0004 |

[1]Stock Solution B was adjusted to pH 3.0 using 1.0 N hydrochloric acid.

An apparatus for treating model wastewater was made with a water impermeable, gas permeable layer and with oxygen delivery to one side of the gas permeable layer. Discs of gas permeable layer (137 microns thick, propylene, Gurley densometer reading of 10 seconds per 50 cc, 75% void, prepared as taught in U.S. Pat. No. 5,238,623 (Mrozinski)), were punched out of roll stock using a 7 mm cork borer. Each disc was placed between two o-rings and screwed into a standard joint size 10/18 TEFLON™ thermometer adapter (available from VWR Scientific Products, Minneapolis, Minn.), that served as the gas permeable layer housing to form a gas permeable layer assembly. Biofilm growth was carried out in an amber glass reaction vessel (1000 mL wide mouth packer, amber glass, open-top plastic lid, available from VWR), the amber glass serving to prevent the undesirable growth of phototropic algae. Air-tight fittings were installed in the lids of the reaction vessels by gluing double-sided nylon tubing connectors into holes drilled through the lids. The apparatus was suspended in the reaction vessel attached to tubing communicating with an oxygen delivery manifold through a tubing connector set into the lid. In this configuration, one side of the gas permeable layer was exposed to oxygen and the other side was exposed to an aqueous medium. A constant flow of nitrogen was provided to the headspace of the vessel via an inlet hole and an exhaust hole in the lid to confine oxygen to the gas permeable layer assembly. Because of the constant nitrogen flow to the reactor, the gas permeable layer was the only source of oxygen in the reaction vessel. A plurality of reactors was connected to the nitrogen supply in series and to the oxygen supply manifold in parallel.

Each reactor was filled with 750 mL of the test medium base solution described above, which was stirred at a moderate rate via a magnetic stir plate. A humidifying bubbler was filled with the same test medium and attached to the nitrogen delivery tube that passed into the reactor. Oxygen was provided to the gas permeable layer at a pressure of between 240 and 500 Pa (1–2 inches of $H_2O$), resulting in an oxygen flow rate of 100–300 mL/min as measured by a gas flow meter. At this pressure, no gas bubbles were observed on the liquid-contacting side of the gas permeable layer, and flow of oxygen through the gas permeable layer was by diffusion alone. After an equilibration period of about 30 minutes, each apparatus was inoculated with 3.75 ml of liquid microbial concentrate (GT-1000HC, Bio-Genesis Technology, Inc., Scottsdale, Ariz.) containing multiple *Bacillus* and *Arthrobacter* bacterial strains to make a wastewater test medium. The apparatuses were then incubated at room temperature with gentle stirring and continuing gas delivery as described above.

Figure 10:
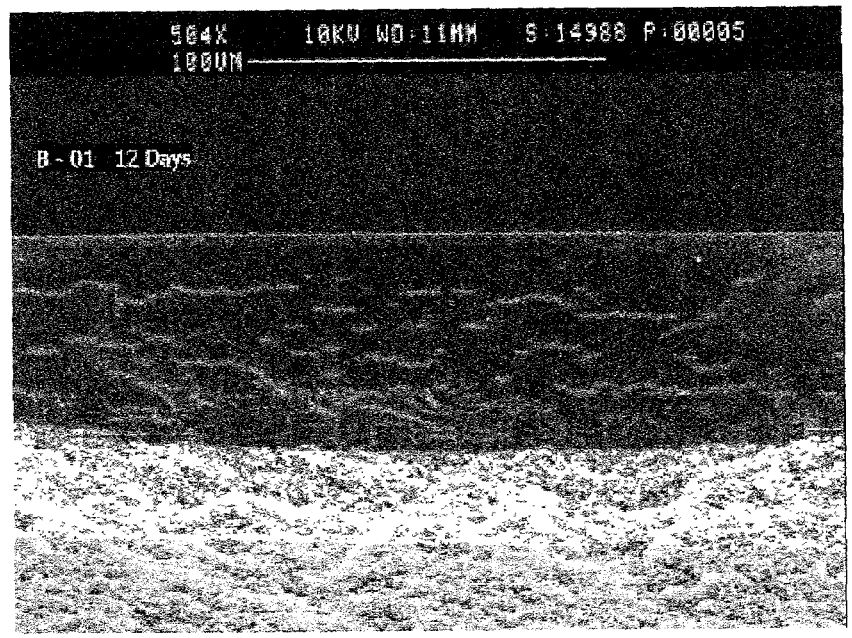
FIG. 10 shows a scanning electron microscope (SEM) micrograph of the side view of a contiguous biofilm on the gas permeable layer of an embodiment of the inventive apparatus after 12 days of trans-membrane oxygenation in the presence of model wastewater, with a magnification of 504×.

Gas permeable layer assemblies were examined periodically to assess biofilm growth. "Islands" of bacteria were observed on the surface of the gas permeable layers after 8 days, and contiguous biofilms roughly 50 μm thick were observed after 12 days. As is common in membrane supported biofilms, these biofilms displayed marginal adhesion to the surface of the gas permeable layers and could be easily sheared off. FIG. 10 shows the biofilm on the surface of the gas permeable layer after contact with wastewater test medium for 12 days. This example shows that gas permeable layers can provide an effective biofilm support, being impermeable to an aqueous phenol solution while being sufficiently permeable to oxygen to enable the establishment of a microorganism layer. However, it also indicates that it may be desirable for the apparatus to further comprise the microbial support layer to reduce or eliminate the sloughing off of the biofilm.

Example 7

This Example illustrates the growth of a biofilm on the surface of a support layer laminated to a gas permeable layer.

A laminate was prepared by thermally bonding one surface of a gas permeable layer (a gas permeable layer as used in Example 6) to one surface of a microbial support layer as described in Sample 4F of Example 5. Discs of the laminate were punched out of roll stock using a 7 mm cork borer. Thermal bonding of the discs was accomplished by heating a 6 mm cork borer on a hot plate and pressing it onto the stacked discs to create a 6-mm diameter circular bond. Biofilms were grown on the laminates that were prepared using the procedure described in Example 6, with the microbial support layer side of the laminate contacting the wastewater test medium.

Figure 11:
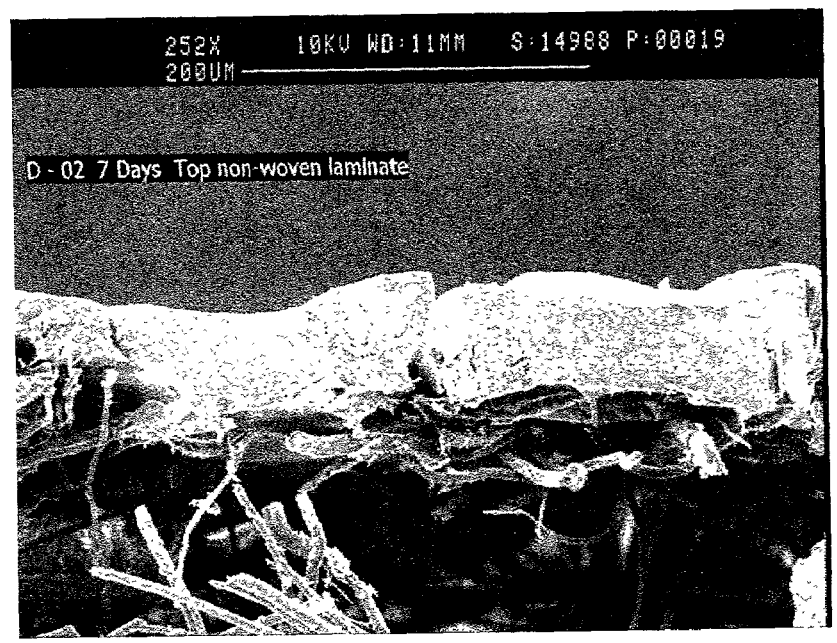
FIG. 11 shows a SEM digital micrograph of the side view of biofilm grown in and on the microbial support layer of an embodiment of the present inventive apparatus, with magnification of 252×.
Figure 12:
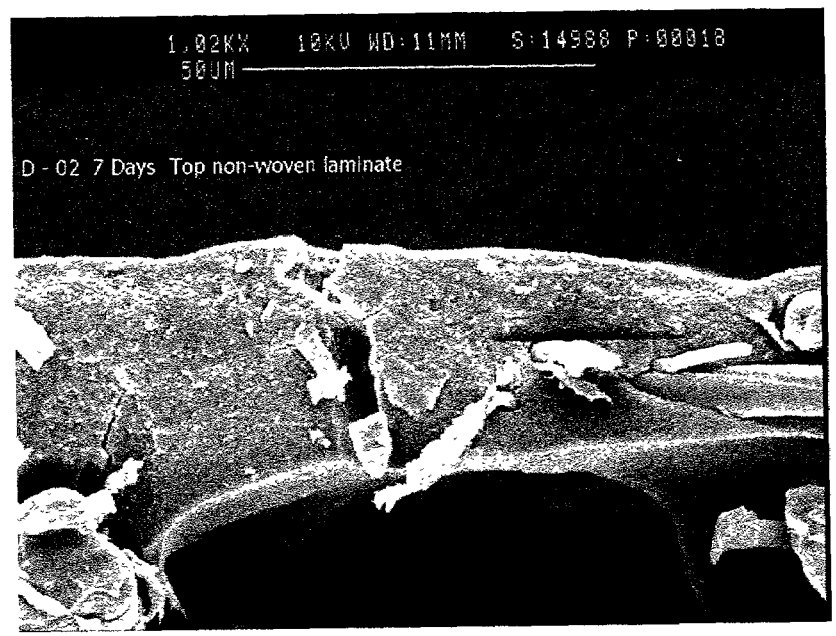
FIG. 12 shows a SEM digital micrograph of the side view of biofilm grown in and on the microbial support layer of an embodiment of the present inventive apparatus, with magnification of 1,020×.

Anchorage for the biofilms to the support layer was improved over that seen in Example 6. SEMs of the cross-sections of these biofilms after 7 days of trans-membrane oxygenation are illustrated in FIG. 11. The biofilm did not penetrate the nonwoven or support layer in this example, but instead grew on its exterior surface. Interestingly, however, nonwoven microfibers can be clearly seen penetrating the biofilm, as shown in FIG. 12, which accounts, at least in part, for its increased adhesion. Complete ingrowth of the biofilm into a support layer might be accomplished by (1) increasing the interfiber spacing or (2) adjusting of the fiber surface chemistry to render the support surface more adhesive toward bacteria (e.g., by coating with a positively charged polymer). This would be expected to provide dramatically enhanced adhesion of the biofilm. It may also permit the control of the thickness of the biofilm, which could be relatively independent of the fluid velocity of the wastewater medium at the biofilm surface.

Example 8

This illustrates a method of increasing the oleophobicity of the gas permeable layer.

Gas permeable layers used in Example 6 were made resistant to oil wetting by plasma fluorination treatment. Samples were taped to a rotating ground electrode drum which rotated through a plasma zone formed under a concentric powered electrode that had a length of 0.76 m (2.5 ft). The plasma power was 300 W, and the pressure was 66.5 Pa (500 mTorr) for all runs. Samples were run at various rotation rates (resulting in various plasma exposure times) and with various gases, as noted in Table 3. Flow rates are reported in standard cubic centimeters (sccm).

The water and oil wetting resistance of untreated and treated gas permeable layers were tested by placing drops of Fluid A (deionized water, surface energy of 72.0 dyne/cm), Fluid B (mineral oil, surface energy of 34.7 dyne/cm) and Fluid C (a mixture of n-hexadecane—having a surface energy of 27.5 dyne/com—and mineral oil in a weight ratio of 35:65) on their surfaces.

TABLE 3

| Sample | Drum Rotation m/min | Plasma Exposure sec | Plasma Gas Type | Flow sccm | Wetting Behavior Fluid B | Fluid C |
|---|---|---|---|---|---|---|
| A | 0.61 | 50.0 | $C_3F_8$ | 95 | nonwet | wet |
| B | 1.22 | 25.0 | $C_3F_8$ | 95 | nonwet | wet |
| C | 2.44 | 12.5 | $C_3F_8$ | 95 | wet | wet |
| D | 0.61 | 50.0 | $C_4F_{10}$ | 77 | nonwet | wet |

Fluid A failed to wet all of the samples, including untreated ones. Fluid B wet untreated samples immediately and Sample C after a delay time of 3–5 min. However, Fluid B failed to wet Samples A, B and D. The Fluid C wet all samples, though plasma fluorinated samples exhibited a delay in wetting of this solution. Thus, plasma treatment times of at least 25 seconds resulted in complete resistance of the gas permeable layer to wetting by Fluid B. This wetting behavior persisted on all gas permeable layers after 10 weeks of storage in air. Enhanced resistance to Fluid B wet-out might be desirable for the treatment of wastewater that contained high concentrations of oils and greases. It was also observed that plasma treatment of the gas permeable layer of this example at the conditions used only resulted in improved oleophobicity on the treated side.

Various modifications and alterations of this invention will become apparent to those skilled in the art without departing from the scope and spirit of this invention.

What is claimed is:

1. A layered sheet construction comprising:
   a. at least one gas permeable, water impermeable layer comprising a microporous layer coated with a gas permeable, polymeric coating;
   b. a gas delivery layer proximate the layer of part a, which gas delivery layer comprises a base having a side on which there are a plurality of walls forming a plurality of separate flow channels through which gas can be conveyed to the layer of part a, the ends of said walls opposite the base being attached to the microporous layer; and further comprising a microbial population proximate the layer of part a.

2. A process for removal of at least one organic substance or at least one nitrogen source from an aqueous medium containing such a source, said process comprising:
   a. providing at least one layered sheet construction of claim 1;
   b. establishing a microorganism layer on the layer of part a. of the layered sheet construction;
   c. supplying a gas to the gas delivery layer of the layered sheet construction; and
   d. contacting the aqueous medium with the microorganism layer.

3. A layered sheet construction comprising:
   a. at least one gas permeable, water impermeable microporous membrane layer;
   b. a gas delivery layer proximate the layer of part a, which gas delivery layer comprises a base having a side on which there are a plurality of walls forming a plurality of separate flow channels through which gas can be conveyed to the layer of part a, the ends of said walls opposite the base being attached to the microporous layer; and
   c. at least one microbial support layer located on the side of the gas permeable, water impermeable layer of part a opposite the gas delivery layer, said microbial support layer comprising a material suitable for the attachment and growth of a microbial population, and said microbial support layer being rendered hydrophilic, or having increased hydrophilicity, by a means selected from: i. being coated with a hydrophilic polymer; ii. having a hydrophilic polymer grafted to the microbial support layer; iii. incorporation of a surface active additive having a hydrophilic chemical group into the microbial support layer; and iv. a process comprising placing a microporous polymeric membrane in an ion sheath of a plasma containing a reactive species which reacts with the membrane surface and pore interiors.

4. The layered sheet construction of claim 3 which is wound into a helix having successive winds spaced apart to form a gap.

5. A process for removal of at least one organic substance or at least one nitrogen source from an aqueous medium containing such a source, said process comprising:
   a. providing at least one layered sheet construction of claim 3;
   b. establishing a microorganism layer on or in the microbial support layer of such layered sheet construction;
   c. supplying a gas to the gas delivery layer of said layered sheet construction; and
   d. contacting the aqueous medium with the microorganism layer.

6. The layered sheet construction of claim 3 in which the microbial support layer is a microporous polymeric membrane of part c. iv. of which the interiors of the pores have bonded thereto a species selected from the group consisting of oxygen, nitrogen, silicon, carbon, hydrogen, sulfur and combinations thereof.

7. A layered sheet construction comprising:
   a. at least one gas permeable, water impermeable microporous membrane layer;
   b. a gas delivery layer proximate the layer of part a, which gas delivery layer comprises a base having a side on which there are a plurality of walls forming a plurality of separate flow channels through which gas can be conveyed to the layer of part a, the ends of said walls opposite the base being attached to the microporous layer; and
   c. at least one microbial support layer located on the side of the gas permeable, water impermeable layer of part a opposite the gas delivery layer, said microbial support layer comprising a material suitable for the attachment and growth of a microbial population and said microbial support layer characterized by carrying a net positive surface charge.

* * * * *